United States Patent [19]
Toufar et al.

[11] Patent Number: 5,916,836
[45] Date of Patent: Jun. 29, 1999

[54] METHOD OF MANUFACTURE OF MOLECULAR SIEVES

[75] Inventors: Helge Toufar; Simone Toufar, both of Dessau, Germany; Philip Kenerick Maher, Queenstown, Md.; Adeola Florence Ojo, Chatham, N.J.; Frank R. Fitch, Bedminster, N.J.; Martin Bülow, Basking Ridge, N.J.

[73] Assignees: Tricat Management GmbH, Bitterfeld, Germany; The BOC Group, Inc., New Providence, N.J.

[21] Appl. No.: 08/834,672

[22] Filed: Apr. 1, 1997

Related U.S. Application Data

[60] Provisional application No. 60/034,448, Dec. 27, 1996.
[51] Int. Cl.[6] ............................................ C01B 39/02
[52] U.S. Cl. .......................... 502/86; 502/64; 502/60; 502/73; 502/79; 502/78; 502/80; 502/84
[58] Field of Search ............................. 502/60, 64, 73, 502/74, 79, 80, 84, 86, 78

[56] References Cited

U.S. PATENT DOCUMENTS

| | | |
|---|---|---|
| 3,405,055 | 10/1968 | Bittner . |
| 3,576,901 | 4/1971 | Kokotailo et al. .......................... 502/64 |
| 3,732,326 | 5/1973 | Chen . |
| 3,794,598 | 2/1974 | Schlaffer . |
| 3,985,859 | 10/1976 | Blaine ...................................... 423/238 |
| 4,724,275 | 2/1988 | Hinnenkamp et al. . |
| 5,268,023 | 12/1993 | Kirner . |
| 5,464,467 | 11/1995 | Fitch et al. ................................... 95/98 |

FOREIGN PATENT DOCUMENTS

| | | |
|---|---|---|
| 0 149 018 | 7/1985 | European Pat. Off. . |
| 0149018 | 7/1985 | European Pat. Off. . |
| 0 462 598 A2 | 12/1991 | European Pat. Off. . |

*Primary Examiner*—Michael Lewis
*Assistant Examiner*—Thomas G. Dunn, Jr.
*Attorney, Agent, or Firm*—Coleman R. Reap; Salvatore P. Pace

[57] ABSTRACT

Zeolites exchanged with lithium ions and, optionally, with polyvalent cations are prepared by ion-exchanging a sodium-containing zeolite, a potassium-containing zeolite or a sodium- and potassium-containing zeolite with ammonium ions, thereby replacing the sodium and/or potassium ions with ammonium ions, and then reacting the ammonium ion-exchanged zeolite with a water-soluble lithium compound under conditions which result in the removal of ammonia from the reaction zone. Polyvalent ions, which may be present in the zeolite undergoing ion-exchange, will not be substantially replaced by the ammonium or lithium ions.

29 Claims, No Drawings

METHOD OF MANUFACTURE OF MOLECULAR SIEVES

This application claims priority based on Provisional application Ser. No. 60/034,448, filed Dec. 27, 1996.

FIELD OF THE INVENTION

The present invention relates to a method of producing cation-exchanged molecular sieves, and more particularly to a method of producing cation-exchanged zeolites by contacting ammonium-containing forms of the molecular sieves with appropriate sources of lithium and/or other cations under conditions in which ammonia is driven from the zone of contact.

BACKGROUND OF THE INVENTION

Many industrially utilized zeolites are most economically synthesized in their sodium, potassium or mixed sodium-potassium cation forms. For example zeolites A (U.S. Pat. No. 2,882,243), X (U.S. Pat. No. 2,882,244) and mordenite (L. B. Sand: "Molecular Sieves", Society of Chemistry and Industry, London (1968), p71–76) are usually synthesized in their sodium forms, whereas zeolites LSX (X in which the ratio of silicon to aluminum is approximately 1, UK 1,580,928) and L U.S. Pat. No. 3,216,789) are usually synthesized in their mixed sodium and potassium forms. Zeolite L may also readily be synthesized in its pure potassium form.

Although these zeolites have useful properties as-synthesized, it may be preferred to ion-exchange them to further enhance their adsorption and/or catalytic properties. This topic is discussed at length in chapter 8 of the comprehensive treatise of Breck (Donald W. Breck: "Zeolite Molecular Sieves", Pub. Wiley, New York, 1973). Conventional ion-exchange of zeolites is carried out by contacting the zeolite, in either powdered or agglomerated form, using batch-wise or continuous processes, with aqueous solutions of salts of the cations to be introduced. These procedures are described in detail in Chapter 7 of Breck (See Above) and have been reviewed more recently by Townsend (R. P. Townsend: "Ion Exchange in Zeolites", in Studies in Surface Science and Catalysis, Elsevier (Amsterdam) (1991), Vol. 58, "Introduction to Zeolite Science and Practice", p 359–390). Conventional exchange procedures may be economically used to prepare many single and/or mixed cation exchanged zeolites. However, in the cases, particularly, of lithium, rubidium and/or cesium exchange of sodium, potassium, or sodium-potassium zeolites, not only are the original cations strongly preferred by the zeolite (meaning that large excesses of the lithium, rubidium and/or cesium cations are needed to effect moderate or high levels of exchange of the original cations), but the salts themselves are expensive. This means that these particular ion-exchanged forms are considerably more expensive to manufacture than typical adsorbent grades of zeolites. Great efforts must be made to recover the excess ions of interest from the residual exchange solutions and washings in which the excess ions remain mixed with the original ions exchanged out of the zeolite, in order to minimize the cost of the final form of the zeolite, and to prevent discharge of these ions to the environment. Since lithium-containing zeolites have great practical utility as high performance adsorbents for use in the noncryogenic production of oxygen, and rubidium and cesium exchanged zeolites have useful properties for the adsorptive separation of the isomers of aromatic compounds and as catalysts, this problem is of significant commercial interest.

U.S. Pat. No. 4,859,217 discloses that zeolite X (preferably with a silicon to aluminum ratio of 1 to 1.25), in which more than 88% of the original sodium ions have been replaced by lithium ions, has very good properties for the adsorptive separation of nitrogen from oxygen. The base sodium or sodium-potassium form of the X zeolite was exchanged, utilizing conventional ion-exchange procedures and 4 to 12 fold stoichiometric excesses of lithium salts.

Additionally, a wide range of other lithium-containing zeolites have been claimed to exhibit advantageous nitrogen adsorption properties: U.S. Pat. Nos. 5,179,979, 5,413,625 and 5,152,813 describe binary lithium- and alkaline earth-exchanged X zeolites; U.S. Pat. Nos. 5,258,058, 5,417,957 and 5,419,891 describe binary lithium- and other divalent ion-exchanged forms of X zeolite; U.S. Pat. No. 5,464,467 describes binary lithium- and trivalent ion-exchanged forms of zeolite X; EPA 0685429 and EPA 0685430 describe lithium-containing zeolite EMT; and U.S. Pat. No. 4,925,460 describes lithium-containing zeolite chabazite. In each case conventional ion-exchange procedures are contemplated, involving significant excesses of lithium over the stoichiometric quantity required to replace the original sodium and/or potassium ions in the zeolite. In the case of the binary-exchanged zeolites, it may sometimes be possible to slightly reduce the quantity of lithium salt used by carrying out the exchange with the second cation before the lithium ion-exchange step (U.S. Pat. No. 5,464,467) or by carrying out both exchanges simultaneously (EPA 0729782), but in either case a large excess of lithium ions is still needed to achieve the desired degree of exchange of the remaining sodium and potassium ions.

The properties and uses of alkali metal exchanged zeolites are reviewed by D. Barthomeuf in the learned paper "Basic Zeolites: Characterization and Uses in Adsorption and Catalysis", published in "Catalysis Reviews, Science and Engineering, 1996, Vol. 38, N4, p.521.

U.S. Pat. No. 4,613,725 teaches a process for separating ethylbenzene from xylenes using a rubidium-substituted X-type zeolite.

JP A 55,035,029 describes a cesium- and lithium- and/or potassium-exchanged zeolite L with useful properties for the separation of p-xylene from mixtures of xylene isomers.

U.S. Pat. No. 5,118,900 describes a catalyst for the dimerization of olefins comprising a low sodium natural faujasite or zeolite Y and at least one alkali metal hydroxide, preferably KOH, wherein the metal hydroxide is supported on the zeolite and is present in the range of 1 to 25 per cent by weight. DE 3330790 describes a catalyst for the preparation of ethyltoluene from the corresponding xylenes and methanol using an alkali metal-exchanged form of zeolites X or Y prepared by exchange of the zeolite with a cesium salt (preferably the hydroxide, borate or phosphate) and optionally a lithium salt (preferably LiOH).

Cation exchange of zeolites has also been demonstrated to occur when the base zeolite is brought into intimate solid-state contact with salts of the desired cations, and, if necessary, heating the mixture. This subject is discussed in detail by Karge (H. G. Karge: "Solid State Reactions of Zeolites", in Studies in Surface Science and Catalysis, Vol. 105C, Elsevier (Amsterdam) (1996), "Progress in Zeolite and Microporous Materials" (H. Chon, S.-K. Ihm and Y. S. Uh (Editors) p1901–1948). The solid-state ion-exchange between zeolite sodium Y and metal chlorides (including lithium and potassium chlorides) is described by Borbely et al. (G. Borbely, H. K. Beyer, L. Radics, P. Sandor, and H. G. Karge: Zeolites (1989) 9, 428–431) and between $NH_4Y$ and metal chlorides (including those of lithium and potassium) by Beyer et al. (H. K. Beyer, H. G. Karge and G. Borbely: Zeolites (1988) 8, 79–82). The main problem with the solid-state ion-exchange procedures of the prior art is that the exchanged zeolite is produced in admixture with salts of the original cations. Washing of the resulting exchanged zeolite to remove the salts of the cations originally contained in the zeolite can often lead to at least partial back exchange of the original cations into the zeolite. There is a need for a process for the production of lithium-, rubidium- and/or cesium-exchanged zeolites which does not require the use of large excesses of expensive salts of these cations and which has the added advantage that it does not require the use of expensive and energy intensive cation recovery schemes. This invention provides such a process.

SUMMARY OF THE INVENTION

According to a broad embodiment, the invention comprises a method of producing an ion-exchanged material comprising contacting an ammonium ion-containing material selected from ion-exchangeable molecular sieves, ion-exchangeable clays, ion-exchangeable amorphous aluminosilicates and mixtures of these with one or more sources of cations selected from Group IA ions, Group IB ions, monovalent ions of Group IIB, monovalent ions of Group IIIA of the Periodic Table and mixtures of these in a reaction zone under conditions which effect the replacement of the ammonium ions with one or more of the Group IA ,Group IB, Group IIB or Group IIIA ions and the removal of at least one reaction product from the reaction zone.

In a preferred aspect of this embodiment, the ion or ions which replace the ammonium ions are selected from lithium, rubidium, cesium and mixtures of these. In a more preferred aspect, the ammonium ions are replaced with lithium ions. In this more preferred aspect, the source of the lithium ions is preferably lithium hydroxide or a precursor thereof.

In another preferred aspect of the above embodiment, the reaction zone is an aqueous medium. In this aspect this reaction between the ammonium ion-containing material and the Group IA or Group IB ions is preferably carried out at a temperature in the range of about 0 to about 100° C. The reaction is preferably carried out at a pH value greater than about 7, and most preferably carried out at a pH value greater than about 10.

In another aspect of the above-described broad embodiment, the reaction between the ammonium-containing material and the Group IA, Group IB, Group IIB or Group IIIA ions is carried out in the solid state, for example, in the substantially dry state. In this aspect the reaction is preferably carried out at a temperature in the range of about 0 to about 550° C.

In the above-described broad embodiment of the invention, the reaction may be carried out at an absolute pressure of less than one bar, i.e. under a vacuum, to ensure removal of at least one gaseous or volatile reaction product from the reaction zone. Additionally or alternatively, the reaction zone is flushed with a purge gas during the reaction. The reaction may also be performed at a pressure greater than one bar if measures are taken to ensure that at least one gaseous or volatile reaction product is effectively removed from the reaction zone.

In a preferred aspect of the broad embodiment, the ammonium ion-containing material is prepared by contacting a material selected from ion-exchangeable molecular sieves, ion-exchangeable clays, ion-exchangeable amorphous aluminosilicates and mixtures of these materials with a water-soluble ammonium compound. The water-soluble ammonium compound is desirably ammonium sulfate, ammonium chloride, ammonium nitrate, ammonium acetate or mixtures of these.

In a more preferred aspect of the invention, the ammonium ion-containing material comprises one or more ion-exchangeable molecular sieves. In this aspect, the ion-exchangeable molecular sieves are selected from natural and synthetic zeolites. More preferably the selected ion-exchangeable molecular sieve is one or more synthetic molecular sieves selected from type A zeolites, type X zeolites, type Y zeolites, EMT type zeolites and mixtures of these. In a most preferred aspect, the ion-exchangeable molecular sieve is type X zeolite having a framework silicon-to-aluminum atomic ratio of 0.9 to 1.1.

In another aspect, the ammonium ion-containing material is produced by contacting a sodium ion-containing material, a potassium ion-containing material or a sodium ion- and potassium ion-containing material with a water-soluble ammonium salt. The water-soluble ammonium salt is preferably ammonium sulfate, ammonium chloride, ammonium nitrate, ammonium a cetate or mixtures of these.

In another preferred aspect of the broad embodiment, the ammonium ion-containing zeolite X, Y, EMT or mixtures of these is produced by contacting a sodium ion-containing material with a water-soluble potassium salt and with a water-soluble ammonium salt.

In a more preferred aspect, the ammonium ion-containing zeolite X, Y, EMT or mixtures of these is produced by contacting a sodium ion-containing zeolite X, Y, EMT or mixtures of these first with a water-soluble potassium salt and then with a water-soluble ammonium salt.

In another aspect of the invention, the ion-exchanged material additionally contains one or more polyvalent cations. These may be initially present in the treated material or introduced at any time during the process. In a preferred embodiment the ammonium ion-containing material additionally contains one or more polyvalent cations. In a more preferred embodiment, the sodium ion-containing material or potassium ion-containing material or sodium ion- and potassium ion-containing material initially treated additionally contains one or more polyvalent cations. The polyvalent cations preferably are one or more of calcium, magnesium, barium, strontium, iron II, cobalt II, manganese II, zinc, cadmium, tin II, lead II, aluminum, gallium, scandium, indium, chromium III, iron III, yttrium, and lanthanide series ions. Most preferably, the polyvalent cations comprise one or more trivalent cations.

In a specific embodiment of the invention a zeolite, preferably a type X, type Y, type A or type EMT zeolite, or mixtures of these, which contains sodium ions is partially ion-exchanged with divalent or trivalent cations and then ion-exchanged with a water soluble ammonium salt to effect replacement of the sodium ions remaining on the zeolite and any potassium ions contained on the zeolite without substantially affecting the divalent or trivalent cations on the zeolite. The ammonium ion-containing zeolite is then reacted with a source of lithium ions, preferably lithium hydroxide, preferably in an aqueous medium, thereby replacing the ammonium ions with lithium ions and releasing ammonia from the reaction zone. In a preferred aspect of this embodiment the zeolite is type X zeolite, and in a most preferred aspect the zeolite is type X zeolite having a framework silicon-to aluminum atomic ratio of about 0.9 to about 1.1, for example about 1. In this most preferred aspect the zeolite has potassium ions as exchangeable cations, or it is at least partially ion-exchanged with potassium ions prior to ion-exchange with ammonium ions.

DETAILED DESCRIPTION OF THE INVENTION

This invention in general describes a method for making cation-exchanged materials of a desired composition in a very effective way, overcoming the problems of currently practiced processes. The ion-exchange process of this invention is carried out under conditions in which at least one of the reaction products is removed from the reaction zone. Under such conditions, the reaction will continue until the exchange is practically complete without the requirement for the use of large excesses of the exchanging cations. The ion-exchange may be in liquid phase, wherein at least one reaction product is gaseous or volatile and can be purged out of the reaction zone, or, it may be a solid state reaction, wherein, again, at least one of the reaction products is gaseous, or volatile and will vaporize or sublime from the system. The principle of this invention can be applied to any material which exhibits a tendency for the exchange of cations within the material. A special area for the application of the invention is the production of zeolitic molecular sieves (zeolites) containing a certain type of exchangeable cation or a mixture of different types of exchangeable cations in defined amounts.

The ion-exchange material which is to be treated in accordance with the teachings of the invention can be any of the many substances which contain exchangeable cations. Such substances include molecular sieves, including natural zeolites, such as faujasite, chabazite, offretite, erionite, mordenite, clinoptilolite, stilbite, analcime, gmelinite, levyne etc.; synthetic zeolites, such as zeolites of the FAU, EMT, LTA, CHA, LTL, and MOR structure types; clays, such as montmorillonite, etc.; and amorphous aluminosilicates. The process of the invention is especially suitable for the ion-exchange of zeolite A, zeolite X, zeolite Y, EMT or mixtures of these.

The ion-exchange material generally initially has sodium and/or potassium ions as exchangeable cations. It may also have divalent or trivalent cations. Divalent cations that can be present in the ion-exchange material include ions of the elements of Group IIA of the Periodic Table, such as magnesium, calcium, strontium and barium, as well as divalent ion forms of multivalent elements, such as iron II, cobalt II, manganese II, chromium II, zinc, cadmium, tin II, lead II, nickel, etc. Trivalent cations which may be present on the ion-exchange material include aluminum, scandium, gallium, yttrium, iron (III), i.e., ferric ion, chromium (III), i.e., chromic ion, indium and ions of the lanthanide series. The lanthanide series ions include lanthanum, cerium, praseodymium, neodymium, promethium, samarium, europium, gadolinium, terbium, dysprosium, holmium, erbium, thulium, ytterbium, and lutetium ions. Mixtures of any two or more of the above multivalent ions can also be used to make the adsorbent of the invention. Preferred trivalent cations include aluminum, cerium, lanthanum and lanthanide mixtures in which the combined concentrations of lanthanum, cerium, praseodymium and neodymium totals at least about 40%, and preferably at least about 75% of the total number of lanthanide ions in the mixtures.

The amount of divalent and/or trivalent cations initially in the ion-exchange material is not critical to the process. In general, when such polyvalent cations are present, they are generally present at concentrations up to about 50%, based on the total number of cations on the ion-exchange material.

The monovalent ion or ions to be introduced can be selected from Group IA, Group IB or monovalent cations of Group IIB or Group IIIA. The maximum economic advantage is achieved if commercially available compounds of the ion are expensive, since the present invention requires no excess, or only a minor stoichiometric excess, of these substances while prior art methods require many fold excesses of the same substances.

Preferred monovalent cations for ion-exchange are those of Group IA of the Periodic Table other than sodium and potassium ions, and ions of Group IB. Included in this class are lithium, rubidium, cesium, copper I, silver and gold. The process is particularly useful for ion-exchange with lithium, rubidium and cesium, and is most useful for introducing lithium ions into ion-exchange materials.

The process of this invention is multistep and includes a first step in which ammonium ions are substituted for the sodium and/or potassium ions and a second step in which the desired monovalent ion or ions are substituted for the ammonium ions in the material.

The invention generally requires the material in which it is desired to introduce selected monovalent ions to be in the ammonium ion form, but in certain cases ions similar to ammonium, for example alkyl ammonium ions, can be used instead. The ammonium form of the ion-exchange material can be obtained by conventional ion-exchange with any water-soluble ammonium salt. Where the degree of ammonium exchange by direct methods is limited by structural constraints, a complete exchange can be achieved if the exchange is carried out in the presence of an additional ion that exhibits chemical similarity with the ammonium ion but with higher polarizability, e.g., $K^+$, $Ag^+$ or $Tl^+$. Such an indirect exchange can be done by either exchanging the starting material first with the additional ion and then contacting the resulting material with an aqueous solution of an ammonium salt or by performing a continuous countercurrent exchange of the starting material with an aqueous solution of an ammonium salt in the presence of the additional cation. In either case the additional ion is not consumed during the process. The ammonium exchange is desirably done to such an extent that the amount of original cations left in the product meets the requirements for the final product since no substantial further exchange of these ions takes place during the following step.

The ammonium exchange can be carried out in a stirred vessel at temperatures higher than ambient temperatures, and preferably slightly below the boiling point of the system, using an ammonium salt solution. Since a substantially complete exchange is desired, it may be preferable to use a multiple stage process for the ammonium exchange. The same result can be achieved by applying a continuous countercurrent procedure, e.g., on a belt filter. The target ammonium-exchange level is determined by the desired level of lithium ion-exchange. In some cases, it may be useful to start the ammonium exchange from the potassium form of the zeolite. The potassium form can be obtained by, for example, treating the as-synthesized zeolite with a potassium salt-containing aqueous solution under conditions similar to the ammonium exchange procedure. If the ion-exchange process is continuous, e.g., on a belt filter, the potassium exchange step is an intermediate step such that once the process has achieved steady state, no further addition of potassium is required (except to compensate for losses). This procedure renders the whole process very effective for producing a highly exchanged product from the as-synthesized material.

In the final step of the invention, the ammonium form of the ion-exchange material is contacted with a compound of the desired ion under conditions in which ammonia, or a volatile ammonium containing compound, is driven from the reaction zone. Preferably, this step is done in an aqueous environment where the source of the cation is its hydroxide or a precursor thereof, i.e., the oxide or the pure metal, if it reacts with water to form the hydroxide, or any salt of the cation if its aqueous solution has a pH value higher than about 10. The reaction can be carried out at any temperature at which the system remains in the liquid state, however, the rate of the reaction is increased substantially if elevated temperatures, preferably temperatures of 50° C. or higher, are applied. The ammonia generated may be purged from the ion-exchange slurry by blowing air or other suitable gases through the slurry at temperatures higher than normal ambient temperatures. Suitable purge gases are those which will not react with the reactants or exchange products, or otherwise adversely affect or interfere with the desired reaction. The gaseous ammonia released from the reaction zone can then be reabsorbed in a suitable acidic solution using conventional procedures and equipment, if recovery is desired, and it can be subsequently reused for the ammonium exchange. The amount of lithium necessary for the lithium exchange step is at, or slightly above, the stoichiometric amount needed for total replacement of ammonium ions and total conversion of ammonium ions into ammonia. This excess is generally well below 10% of the stoichiometric amount, and the excess lithium is not wasted, since the lithium exchange solution can be at least partially reused for the lithium exchange of subsequent batches when mixed with fresh lithium hydroxide. The lithium exchange step can be carried out in any of various ways, for example, it can be carried out in a stirred vessel, with the lithium hydroxide-containing source being added continuously or in one or more slugs, or it can be carried out by passing the lithium hydroxide-containing solution over the agglomerated form of the ammonium ion-exchanged zeolite in a column.

Alternatively, the final exchange step can be done without the presence of water where the source of the cation can be either the hydroxide, the oxide or any salt of the cation where the anion of this salt forms a volatile compound with ammonium, e.g., the chloride. In such a case, the ingredients are mixed mechanically and then heated up to temperatures at which the reaction product is volatile. If the hydroxide or the oxide is the source of the cation, the reaction can be done at ambient temperature or even lower, and only a mechanical activation is necessary to complete the reaction. If any salt of the cations is used, the reaction temperature should exceed the temperature of sublimation of the corresponding ammonium salt.

The method is especially suitable for producing ion-exchange materials containing a defined mixture of cations that are difficult to exchange by traditional modes. In such a case, the ammonium form of the ion-exchange material is contacted with a stoichiometric mixture of the compounds of the desired cations with any excess required coming from the cation exhibiting the lowest selectivity towards the ion-exchange material.

If the final product contains any cations that are more strongly held in the ion-exchange material than ammonium or the original cation (for example, rare-earth metal cations), these can be introduced by state of the art ion exchange at any stage of the process but preferably prior to the ammonium exchange in order to minimize the amount of ammonium salt required.

The ion exchange material may be in the powdered form or it may be agglomerated and shaped into particles, e.g. extruded pellets. In general, it is preferred to conduct agglomeration before the ammonium ion exchange step or after the lithium ion exchange step. Any crystalline or amorphous binder or combination of binders suitable for use with the ion-exchange material can be used as an agglomerant, and any method of agglomeration can be employed. Typical binders and methods of agglomeration are disclosed in U S. patent applications Ser. No. 08/515, 184, filed on Aug. 11, 1995 and Ser. No. 08/665,714, filed Jun. 18, 1996, and in U.S. Pat. No. 5,464, 467, the disclosures of which are incorporated herein by reference.

The invention is illustrated in the following detailed examples in which, unless otherwise stated, parts, percentages and ratios are on a weight basis.

EXAMPLE 1.

Preparation of lithium LSX

Low silicon X (LSX) was synthesized with a Si/Al atomic ratio of 1.0 according to the procedures described in the East German Wirtschaftspatent DD WP 043,221, 1963. A mixed potassium and sodium form of a low silica X zeolite, herein referred to as Na,K-LSX, was exchanged with potassium by contacting 100 g of the dry zeolite powder three times with 2 liters of 1N $K_2SO_4$ solution at 80° C. for 1 hour. After each step, the zeolite powder was washed with 1 liter of deionized water. The resulting K-LSX zeolite was contacted with 1 liter of a 2N $(NH_4)_2SO_4$ for two hours at 80° C. The ammonium sulfate solution was adjusted to a pH value of 8.5 by adding small amounts of a 25% aqueous solution of ammonia in order to avoid structural damage to the material during the ion exchange. After the ion exchange, the zeolite was washed with 1 liter of deionized water. The procedure was repeated 4 times to obtain the desired level of residual alkali metal ions.

From the resulting $NH_4$-LSX a slurry containing 20 wt % of solid was prepared with deionized water. A 5% aqueous solution of LiOH was added to this slurry dropwise under stirring at such a rate that the apparent pH value of the slurry was at all times between 11 and 12. At the same time, air was bubbled through the slurry at a rate of approximately 100 liters per hour in order to remove the evolving ammonia from the system. In total, a stoichiometric excess of 10% LiOH was added to the slurry. The slurry temperature was held at 50° C. during the addition of LiOH. Finally, the reaction mixture was heated to 80° C. in order to complete the removal of the ammonia. The slurry was then filtered and washed with 1 liter of deionized water that was adjusted to a pH value of 9 by addition of a small amount of LiOH in order to avoid proton exchange.

EXAMPLE 2.

Preparation of trivalent ion, lithium LSX

A sample of LSX containing both lithium metal cations and a mixture of trivalent rare-earth metal cations (RE) was made by contacting 10 g of a $NH_4$-LSX prepared according to Example 1 with 100 ml of a solution containing a total of 3.5 mmol of a mixture of the RE consisting of $La^{3+}$, $Ce^{3+}$, $Pr^{3+}$ and Nd3+ for 6 hours at ambient temperature. The resulting $NH_4$,RE-LSX was then treated with LiOH solution according to the procedure given in Example 1 in order to produce a Li,RE-LSX product essentially free of alkali metal ions other than lithium.

EXAMPLE 3

Preparation of trivalent ion, lithium LSX

A RE containing LSX zeolite was prepared by contacting 100 g of an as-synthesized Na,K-LSX, with 1 liter of a solution containing 35 mmol of a mixture of the rare-earth metal cations $La^{3+}$, $Ce^{3+}$, $Pr^{3+}$ and $Nd^{3+}$ for 6 hours at ambient temperature. The resulting Na,K,RE-LSX was contacted 3 times with 2 liters of 1N $K_2SO_4$ solution for 2 hours at 80° C., filtered and washed with 1 liter of deionized water after each contact. The resulting K,RE-LSX was then treated with ammonium sulfate solution and LiOH solution according to the procedure described in Example 1, in order to produce a Li,RE-LSX zeolite.

EXAMPLE 4

Preparation of lithium LSX

An $NH_4$-LSX was prepared according to the procedure given in Example 1. The sample was then mixed mechanically with a 10% stoichiometric excess of water-free LiCl. This mixture was heated to 350° C. according to the following program:

heating to 120° C. at a rate of 1K/min holding at 120° C. for 2 hours heating to 200° C. at 1.33K/min holding at 200° C. for 2 h heating to 350° C. at 2.5K/min holding at 350° C. for 3 h cooling to ambient temperature.

The resulting sample was washed with 1 liter of a LiOH solution with a pH value of 9 and then dried.

EXAMPLE 5

Preparation of trivalent ion, lithium LSX

An $NH_4$,RE-LSX was prepared according to the procedure of Example 3. The sample was then mixed mechanically with a 10% stoichiometric excess of $LiOH.H_2O$. This mixture was heated to 350° C. according to the following program:

heating to 120° C. at a rate of 1K/min holding at 120° C. for 2 h heating to 200° C. at 1.33K/min holding at 200° C. for 2 h heating to 350° C. at 2.5K/min holding at 350° C. for 3 h cooling to ambient temperature.

The resulting sample was washed with 1 liter of a LiOH solution with a pH value of 9 and then dried and activated.

EXAMPLE 6

Preparation of trivalent ion, lithium LSX

A Li-LSX sample (10 g) prepared according to the procedure of Example 4 was contacted with 100 ml of a solution containing a total of 3.5 mmol of a mixture of the rare earth metal cations $La^{3+}$, $Ce^{3+}$, $Pr^{3+}$ and $Nd^{3+}$ for 6 hours at ambient temperature. After filtration and washing, a Li,RE-LSX, essentially free of alkali metal ions other than lithium was obtained.

EXAMPLE 7

Preparation of lithium LSX

A 5 kg sample of $NH_4$-LSX was prepared according to the procedure of Example 1, but with the ammonium exchange done at 50° C. instead of at 80° C. This product was reslurried with 20 liters of deionized water, and heated to 50° C. with moderate stirring. A 10% stoichiometric excess of a 10% LiOH aqueous solution was added in 0.5 liter portions over a period of 2 hours. During this time, the slurry was stirred and pressurized air was bubbled through it at a rate of approximately 1,200 liters per hour. After the addition of LiOH was finished, stirring and air bubbling were continued for another 8 hours. The resulting product was filtered and washed with 50 liters of aqueous LiOH solution at a pH value of 9. From this material spherical beads of a diameter between 1.6 and 2.5 mm and with a binder content of 15% were prepared.

EXAMPLE 8

Preparation of comparative trivalent ion, lithium LSX

Na-LSX zeolite was first prepared by ion-exchange of the synthetic Na,K-LSX zeolite using three static exchanges with 8 ml of 3.6N NaCl solution per g of zeolite at 90° C. After each exchange, the sample was washed with aqueous NaOH (0.01N).

An aqueous RE salt solution was prepared by dissolving 58.7 g of commercial RE salt mixture (Molycorp 5240) in 4 liters of water at ambient temperature. To this was added 462.2 g of the above Na-LSX and the mixture was stirred overnight. The slurry was filtered and dried. 413 g of the dried Na,RE-LSX was added to an aqueous solution of lithium chloride containing 897 g of LiCl (an 8-fold stoichiometric excess) dissolved in 4 liter of water (adjusted to a pH value of.9 with LiOH). This first lithium ion-exchange step was performed at 80° C. for approximately 19 hours. In order to achieve a low residual sodium content, 40 g of the resulting Li,RE,Na-LSX form was then contacted with a second aqueous lithium chloride solution containing 400 g of LiCl (a further 40-fold stoichiometric excess) dissolved in 1 liter of water (adjusted to a pH value of 9 with LiOH) at 80° C. for about 18 hours. The slurry was filtered and dried.

EXAMPLE 9

Compositions of Examples 1–7 and Comparative Example 8

All the samples were analyzed by Inductively Coupled Plasma Atomic Emission Spectroscpy (ICP-AES) using an ARL-3510 Sequential ICP spectrometer. Their compositions are given in Table 1, where the measured equivalents of the exchangeable cations are normalized to unity.

TABLE 1

Normalized Composition of Li-LSX and Trivalent ion, Li-LSX Samples

| Example No. | $RE^{3+}$ cation equivalent fraction | $Li^+$ cation equivalent fraction | $Na^+$ cation equivalent fraction | $K^+$ cation equivalent fraction |
|---|---|---|---|---|
| 1 | none detected | 0.98 | none detected | 0.02 |
| 2 | 0.05 | 0.95 | none detected | 0.01 |
| 3 | 0.11 | 0.87 | 0.01 | 0.01 |
| 4 | none detected | 0.97 | none detected | 0.03 |
| 5 | 0.08 | 0.92 | none detected | 0.004 |
| 6 | 0.10 | 0.88 | none detected | 0.02 |
| 7 | none detected | 0.96 | 0.02 | 0.01 |
| 8 exchange 1 | 0.12 | 0.71 | 0.17 | none detected |
| exchange 2 | 0.10 | 0.89 | 0.01 | none detected |

EXAMPLE 10

Adsorption Properties of Examples 1–7 and Comparative Example 8

Adsorption isotherms for nitrogen ($N_2$) and oxygen ($O_2$) on lithium LSX and trivalent ion, lithium LSX samples were measured gravimetrically using a Cahn 2000 Series microbalance enclosed in a stainless steel vacuum/pressure system. Pressure measurements in the range 1–10,000 mbar were made using a pressure sensor of the MKS Baratron type. About 100 mg portions of each sample were carefully evacuated and heated to 500° C. at a rate of 5° C. per minute. The adsorption isotherms for nitrogen and oxygen were measured at 25° C. in the pressure range 20–6,600 mbar for nitrogen and 20–2,000 mbar for oxygen, and the data were fitted to a single or multiple site Langmuir isotherm model. The fits to the nitrogen data were used to calculate the nitrogen capacities of the samples at 1 atmosphere, and their effective capacities for nitrogen at 25° C. The effective nitrogen capacity defined as the difference between the nitrogen capacity at 1,250 mbar and that at 250 mbar gives a good indication of the capacity of the adsorbent in a PSA process operated between upper and lower pressures in this range. The selectivities of the samples for nitrogen over oxygen in air at 1,500 mbar and 25° C. were derived from the pure gas isotherms for nitrogen and oxygen using Langmuir mixing rules (cf, e.g., A. L. Myers: AlChE: 29(4), (1983), p 691–693). The usual definition for selectivity was used, where the selectivity (S) is given by:

$S=(x_{N2}/y_{N2})/(x_{O2}/y_{O2})$ where $x_{N2}$ and $x_{O2}$ are the mole fractions of nitrogen and oxygen, respectively, in the adsorbed phase, and $y_{N2}$ and $y_{O2}$ are the mole fractions of nitrogen and oxygen, respectively, in the gas phase.

The adsorption results for the lithium LSX and trivalent ion, lithium LSX samples of the above examples are given in Table 2.

TABLE 2

Adsorption Data for Li-LSX and Trivalent, Li-LSX Samples.

| Example No. | $N_2$ Uptake 1 atm mmol/g | Effective $N_2$ Uptake 1,250–250 mbar mmol/g | Selectivity $N_2/O_2$ 1,500 mbar (air) |
|---|---|---|---|
| 1 | 0.98 | 0.74 | 10.2 |
| 2 | 1.01 | 0.76 | 10.5 |
| 3 | 1.17 | 0.88 | 10.0 |
| 5 | 0.70 | 0.54 | — |
| 6 | 0.58 | 0.44 | 7.0 |
| 7 | 0.89 | 0.68 | 9.7 |
| 8 | 1.20 | 0.89 | 10.6 |

The analytical data presented in Table 1 of Example 9 clearly demonstrate that lithium-containing LSX-type zeolites with low residual sodium and/or potassium levels can be prepared using the novel exchange procedures of this invention, without the requirement for the use of large excesses of lithium-containing salts. Examples 1 and and 7 illustrate the liquid-phase exchange embodiments of this invention for the preparation of Li-LSX materials. Examples 3 and 2 illustrate the liquid phase preparation of mixed lithium and multivalent ion exchanged LSX materials, in which the multivalent ion exchange is performed before and after, respectively, the preparation of the intermediate ammonium form of the base zeolite. Examples 5 through 6 illustrate the solid state exchange embodiments of this invention for the preparation of Li-LSX and Li, RE-LSX materials. Example 4 was not tested.

Comparative Example 8 illustrates the preparation of lithium- and trivalent ion-exchanged LSX by prior art liquid-phase exchange procedures. Following the first lithium exchange step, the product still contained 17% residual sodium (on an equivalents basis), despite the use of an 8-fold stoichiometric excess of the lithium exchange salt. A second exchange step, with a large excess of lithium was then required in order to produce a sample with a low residual sodium content. Using the most efficient, countercurrent, or simulated countercurrent, prior art liquid-phase exchange procedures at least about a four-fold stoichiometric excess of the lithium exchange salt is required in order to achieve samples of lithium or lithium and multivalent ion exchanged zeolite samples with low residual sodium and/or potassium levels.

The adsorption data presented in Table 2 of Example 10 confirm that the adsorption properties of the materials prepared utilizing the teachings of this invention, with only a 10% stoichiometric excess of lithium-exchange salts, are equivalent to those produced, using large excesses of lithium exchange salts, by the prior art exchange procedures.

Although the invention has been described with particular reference to specific equipment arrangements and to specific experiments, these features are merely exemplary of the invention and variations are contemplated. For example, the lithium, rubidium andlor cesium exchange procedures can be carried out either on powdered samples of the ion-exchangeable materials or on agglomerated samples. The scope of the invention is limited only by the breadth of the appended claims.

What is claimed is:

1. A method of producing an ion-exchanged material comprising contacting a material containing Group IA ions selected from the group consisting of sodium ions, potassium ions and mixtures of these, said material being selected from the group consisting of natural zeolites selected from the group consisting of faujasite, chabazite, offretite, erionite, mordenite, clinoptilolite, stilbite, analcime, gmelinite, levyne, and mixtures thereof; synthetic zeolites selected from the group consisting of structure types FAU, EMT, LTA, CHA, LTL, MOR, and mixtures thereof ion-exchangeable clays; ion-exchangeable amorphous aluminosilicates; and mixtures of these, with a source of ammonium ions, thereby at least partially replacing said Group IA ions with ammonium ions and producing ammonium ion-exchanged material, then contacting said ammonium ion-exchanged material with a source of monovalent cations selected from the group consisting of Group IA ions other than sodium and potassium ions, Group IB ions, monovalent ions of Group IIB, monovalent ions of Group IIIA and mixtures thereof in a reaction zone under conditions which effect the replacement of ammonium ions with at least one of said monovalent cations and the removal of at least one reaction product from said reaction zone.

2. The method of claim 1, wherein said cations are selected from the group consisting of Group IA ions, Group IB ions and mixtures of these.

3. The method of claim 2, wherein said cations are lithium, rubidium, cesium or mixtures thereof.

4. The method of claim 3, wherein said ammonium ions are replaced with lithium ions.

5. The method of claim 4, wherein said source of cations is lithium hydroxide or a precursor thereof.

6. The method of claim 5, wherein said reaction zone is an aqueous medium.

7. The method of claim 6, wherein said contacting is carried out at a temperature in the range of about 0 to about 100° C.

8. The method of claim 7, wherein said contacting is carried out at a pH value greater than about 7.

9. The method of claim 7, wherein said contacting is carried out at a pH value greater than about 10.

10. The method of claim 1, wherein said contacting is carried out in the solid phase.

11. The method of claim 4, wherein said contacting is carried out in the solid phase.

12. The method of claim 10, wherein said contacting is carried out at a temperature in the range of about 0 to about 550° C.

13. The method of claim 11, wherein said contacting is carried out at a temperature in the range of about 0 to about 550° C.

14. The method of any one of claims 6, 9, 10, 11, 12 or 13, wherein said contacting is carried out at an absolute pressure of less than one bar.

15. The method of any one of claims 6, 9, 10, 11, 12 or 13, wherein said reaction zone is flushed with a purge gas during said contacting.

16. The method of claim 1, wherein said ammonium ion-containing material is prepared by contacting a material selected from ion-exchangeable molecular sieves, ion-exchangeable clays, ion-exchangeable amorphous aluminosilicates and mixtures of these material with a water-soluble ammonium compound.

17. The method of claim 16, wherein said water-soluble ammonium compound is selected from the group consisting of ammonium sulfate, ammonium chloride, ammonium nitrate, ammonium acetate and mixtures of these.

18. The method of claim 1, wherein said material comprises at least one ion-exchangeable molecular sieve.

19. The method of claim 18 wherein said at least one ion-exchangeable molecular sieve is one or more synthetic molecular sieves selected from type A zeolites, type X zeolites, type Y zeolites, EMT type zeolites and mixtures of these.

20. The method of claim 19, wherein said at least one ion-exchangeable molecular sieve is type X zeolite having a framework silicon-to-aluminum atomic ratio of 0.9 to 1.1.

21. The method of claim 1, wherein said ammonium ion-containing material is produced by contacting a sodium ion-containing material, a potassium ion-containing material or a sodium ion- and potassium ion-containing material with a water-soluble ammonium salt.

22. The method of claim 21, wherein said water-soluble ammonium salt is ammonium sulfate, ammonium chloride, ammonium nitrate, ammonium acetate or mixtures of these.

23. The method of claim 1, wherein said ammonium ion-containing material is produced by contacting a sodium ion-containing material with a water-soluble potassium salt and with a water-soluble ammonium salt.

24. The method of claim 23, wherein said ammonium ion-containing material is produced by contacting a sodium ion-containing material first with a water-soluble potassium salt and then with a water-soluble ammonium salt.

25. The method of claim 1, wherein said ion-exchanged material additionally contains one or more polyvalent cations.

26. The method of claim 21, wherein said ammonium ion-containing material additionally contains one or more polyvalent cations.

27. The method of claim 21, wherein said sodium ion-containing material, said potassium ion-containing material or said sodium ion- and potassium ion-containing material additionally contains one or more polyvalent cations.

28. The method of any one of claims 25–27, wherein said polyvalent cations comprise cations selected from calcium, magnesium, barium, strontium, iron II, cobalt II, manganese II, zinc, cadmium, tin II, lead II, aluminum, gallium, scandium, indium, chromium III, iron III, yttrium, lanthanide series ions and mixtures of these.

29. The method of claim 28, wherein said polyvalent cations comprise one or more trivalent cations.

* * * * *

UNITED STATES PATENT AND TRADEMARK OFFICE
CERTIFICATE OF CORRECTION

PATENT NO. : 5,916,836
DATED : June 29, 1999
INVENTOR(S) : Helge Toufar, Simone Toufar, Philip Kenerick Maher, Adeola Florence Ojo, Frank R. Fitch, Martin Bülow It is certified that error appears in the above-identified patent and that said Letters Patent is hereby corrected as shown below:

In column 12, line 40, after "thereof" insert --;--.

Signed and Sealed this

Fifth Day of September, 2000

Attest:

Q. TODD DICKINSON

*Attesting Officer*    *Director of Patents and Trademarks*